United States Patent [19]

Pace et al.

[11] 3,863,002

[45] Jan. 28, 1975

[54] STATIC LEACHING PROCESS

[75] Inventors: Gerald F. Pace; Earl W. Shortridge, both of Ponca City, Okla.

[73] Assignee: Continental Oil Company, Ponca City, Okla.

[22] Filed: Nov. 15, 1971

[21] Appl. No.: 199,026

Related U.S. Application Data

[63] Continuation-in-part of Ser. No. 135,457, April 19, 1971, abandoned.

[52] U.S. Cl. ............... 423/20, 75/1, 75/101, 75/115, 423/1
[51] Int. Cl. .............................. B01d 11/00
[58] Field of Search .......... 23/311, 312 P, 312 HE, 23/323, 321; 75/1, 101, 115; 423/20, 1

[56] References Cited
UNITED STATES PATENTS

| | | | |
|---|---|---|---|
| 1,098,282 | 5/1914 | McCoy | 23/321 |
| 2,772,957 | 12/1956 | Thomsen | 75/115 |
| 2,797,977 | 7/1957 | Forward et al. | 75/115 |
| 2,819,145 | 1/1958 | McCullough et al. | 23/321 |
| 2,843,450 | 7/1958 | Long | 23/323 |
| 2,894,809 | 7/1959 | McCullough et al. | 23/321 |
| 3,126,249 | 3/1964 | Atkin | 23/321 |
| 3,288,569 | 11/1966 | Henrickson et al. | 23/321 |

*Primary Examiner*—Benjamin R. Padgett
*Assistant Examiner*—R. E. Schafer
*Attorney, Agent, or Firm*—Robert S. Nisbett

[57] ABSTRACT

The present invention relates to a method for leaching a mineral from an ore containing said mineral wherein a lixiviant is introduced under pressure into a vessel containing a bed of ore which has been dried while in an agitated state. A sweep fluid is then introduced into said vessel to sweep the lixiviant containing the dissolved mineral values out of said ore bed.

5 Claims, No Drawings

STATIC LEACHING PROCESS

CROSS-REFERENCES TO RELATED APPLICATIONS

This is a continuation-in-part of our application filed Apr. 19, 1971, under Ser. No. 135,457, entitled Static Leaching Process, now abandoned.

BACKGROUND OF THE INVENTION

1. Field of the Invention

The present invention relates generally to a static leaching process wherein a leaching solution is passed through a bed of ore, which has been dried while in an agitated state, to remove the mineral content from said ore.

2. Description of the Prior Art

Most commercial uranium ores contain only a few pounds of uranium in each ton of ore. Most conventional benefication processes involve leaching the uranium minerals with suitable solvents, then separating the uranium bearing solvent from barren gangue and finally precipitating the dissolved mineral from its solvent.

The separation processes usually employ agitation, pumping, settling, and in a relatively dilute fluid medium. Only minute quantities of solvent are utilized in actually leaching of the mineral. Most of the reagent is required to maintain sufficient reagent concentration in the abundant fluid medium to drive the leaching reactions forward. Additional dilution is imparted to the process in the course of decanting, settling and separating the uranium bearing solvent from barren gangue. The inevitable result is substantial loss of reagent, mostly by dilution.

These conventional processes use great quantities of fluid, water, and reagents in a large and costly plant. The resulting mineral bearing solvent is very dilute and therefore very costly to treat.

Presently uranium ores are leached two ways; one is an agitated leach, the other is a static leach. In the case of the agitated leaching, large volumes of lixiviant are required to do the leaching and a solvent-solution separation step must be used before the uranium can be recovered from the lixiviant. The disadvantages of this system are the large volumes required for leaching, power cost for agitation, high equipment cost for solid-solution separation and excessive dilution of lixiviant after uranium dissolution resulting in a solution low in uranium concentration and low in acid content. If the lixiviant were not excessively diluted during the solid-solution separation step, a large portion of the acid in this solution could be used again.

In the case of present static leaching operations, two methods are used: one is to introduce the lixiviant to the top of a heap of raw ore and allow the lixiviant to percolate through the ore, and the other is to introduce an acid solution with a low concentration of sulfuric acid on top of a heap of ore that has been previously mixed with a solution with a very high acid concentration. There are some problems with this type of leaching; the flow rate is usually extremely low, and there is a great possibility that all the ore will not come into contact with the lixiviant.

SUMMARY OF THE INVENTION

The present invention relates to a method for recovering mineral values from a permeable heterogeneous bed of ore containing said mineral. The method involves first drying the ore, while in an agitated state, to improve the flow characteristics of solutions through the ore bed and then loading the dry ore into a suitable container for leaching. The lixiviant is then introduced under pressure into the vessel containing the bed of ore. After the required amount of lixiviant has been introduced into the ore bed, a low cost fluid is injected to force the lixiviant containing the dissolved mineral values out of the ore bed.

It is an object of this invention to accomplish the leaching of uranium ore with a substantially smaller volume of lixiviant than is required in prior art processes.

A further object of this invention is to provide a process wherein the flow rate of leaching fluid through the bed of ore is improved.

It is also an object of this invention to provide a process wherein there is no need for a solid-solution separation step because the lixiviant discharging from the ore bed is essentially free of solid. Other and further objects will become apparent from the following detailed description of the invention.

DETAILED DESCRIPTION

Broadly described, this invention accomplishes the recovery of mineral values from a permeable heterogeneous bed of ore. The method involves first drying the ore, while in an agitated state such as in a gas fired rotary dryer, to improve the flow characteristics of solutions through the ore bed and then loading the ore into a vessel for leaching. A lixiviant is then introduced under pressure into the vessel containing the bed of ore. After the lixiviant has been introduced into the ore bed, a low cost fluid is injected to force the lixiviant containing the dissolved values out of the ore bed. The novel embodiments of this invention are the introduction of lixiviant under pressure and the drying of the ore while in an agitated state to improve the flow characteristics and sweeping the lixiviant with a low cost fluid. This process is particularly useful for recovering the mineral values from a uranium containing ore. In a system such as this the uranium ore is dried in a gas fired rotary dryer to remove the moisture content and then the mineral ore is placed in a vessel and the lixiviant is introduced under pressure. This lixiviant can be a 1 to 20 weight percent mineral acid solution such as sulfuric acid, nitric acid, or hydrochloric acid. A preferred lixiviant can be a 5 to 10 percent sulfuric acid solution. The lixiviant is introduced under pressure and is then swept through the bed of ore by sweep fluid such as an aqueous potassium salt solution containing less than 10 percent by weight of said salt. A typical potassium salt solution would be a 3% potassium sulfate solution. Water can also be used as the sweep fluid.

The pressure under which the lixiviant is introduced into the system can vary over a wide range of values. The lower limit of pressure being that pressure which will cause sufficient flow of fluid through said bed of ore. The upper limit of pressure is that pressure which can be employed and still retain said bed of ore in place in said vessel. The actual pressure required in each specific case must be determined due to the differences in permeability of various ores.

The permeability of the ore is improved by drying the ore prior to the leaching step. It has been discovered that the lixiviant will flow through the ore bed at a much greater rate if the ore is dried prior to the leaching step. It has also been unexpectedly discovered that drying said ore in an agitated state, such as in a rotary dryer, greatly improves the flow rate of the lixiviant through the bed of ore, and said improvement is not accomplished when said ore is dried in a static state, such as ordinary oven drying.

The method of this invention effectively alleviates the problems inherent in present uranium leaching. This leaching process requires a substantially smaller volume of lixiviant due to the small amount used in leaching as well as no dilution for solid-solution separation. There is no need for a solid-solution separation step because the lixiviant discharging from the ore bed is essentially free of solids.

Also, the effluent often contains a large fraction of the acid required in leaching and can be recycled, whereas in agitated leaching this acid has been diluted and only a very small portion can be reused. Drying the ore while in an agitated state before leaching greatly improves the flow characteristics of the lixiviant in the ore.

The following example illustrates the process of this invention.

EXAMPLE

Ore:
1.4 kg of –¼ inch uranium ore obtained from an ore body located in South Texas.

Column:
1 ⅛ inch ID × 6 foot length lucite column with 200 mesh stainless steel screen as false bottom.

Leach Acid:
5% $H_2SO_4$

Sweep Solution:
Tap water

Procedure:
Ore was dried by the appropriate method and placed into the column through a funnel. Leaching acid was added to the top of the column and 2–6 inches constant head maintained. Percolation distances were determined by measuring the wet ore interface from the top of the ore. After 500–600 ml of acid had been added, the level of acid was allowed to drop to the top of the ore and then tap water was substituted for the acid.

Drying Method:
1. Wet ore — Used ore as received. The ore contained 9% water.
2. Oven dried ore — Ore was placed into trays 3 × 3 feet × 4 inches and dried at 250° F. in a large oven. Samples were split out of a 1,000-lb lot dried in this manner.
3. Rotary flame dried — This dryer consisted of a torch directed into a 20 foot cylinder 1 foot in diameter with lifters on the inside. The cylinder rotated at a small downward angle. At the bottom of the cylinder was a ¼ inch screen. Ore was fed into the dryer at the top or flame end, and the moisture content of the dried ore was controlled by the feed rate of the ore to the dryer.

| Data: | Drying Method | Percolation rate, in/min | Sweep Rate in/min |
|---|---|---|---|
| | 1 | .115 | .0065 |
| | 2 | .164 | .023 |
| | 3 | .260 | .045 |

Although certain specific embodiments of the invention have been described as exemplary of its practice, the example is not intended to limit the invention in any way. Other process parameters and materials may be used in accordance with the broad principles outlined herein and when so used are deemed to be circumscribed by the spirit and scope of the invention except as necessarily limited by the appended claims or reasonable equivalents thereof.

What is claimed is:

1. A static leaching process for recovering mineral values from a permeable bed of ore comprising drying said ore in an agitated state to increase permeability of said ore bed, placing said dried ore into a leaching vessel, adding a lixiviant solution to said ore to leach said mineral values from said ore under pressure sufficient to cause flow of said solution through said bed of ore, percolating said lixiviant solution through said ore to leach said mineral values from said ore, adding a sweep fluid to said ore to sweep said lixiviant containing dissolved mineral values through said bed of ore, and recovering an effluent lixiviant solution from said bed of ore containing said mineral values.

2. A static leaching process of claim 1 for recovering uranium mineral values from permeable bed of ore containing said mineral values said process comprising drying said ore in an agitated state to increase permeability of said ore bed, placing said dried ore into a leaching vessel, adding a lixiviant solution comprising 1–20 weight percent mineral acid to said ore bed to leach said mineral values from said ore under pressure sufficient to cause flow of said solution through said bed of ore, percolating said lixiviant solution through said ore to leach said mineral values from said ore, adding a sweep fluid to said ore to sweep said lixiviant containing dissolved mineral values through said bed of ore, and recovering an effluent lixiviant solution from said bed of ore containing said uranium mineral values.

3. A static leaching process of claim 1 for recovering uranium mineral values from a permeable bed of ore containing said mineral values said process comprising drying said ore in an agitated state in a gas fired rotary drier to increase permeability of said ore bed, placing said dried ore into a leaching vessel, adding a lixiviant solution comprising 5–10 percent sulfuric acid to said ore bed to leach said uranium mineral values from said ore under pressure sufficient to cause flow of said solution through said bed of ore, percolating said lixiviant solution through said ore to leach said mineral values from said ore, adding an aqueous sweep fluid selected from water and an aqueous potassium sulfate solution containing less than 10 weight percent potassium sulfate to said ore to sweep said lixiviant containing dissolved mineral values through said bed of ore, and recovering an effluent lixiviant solution from said bed of ore containing said uranium mineral values.

4. A static leaching process of claim 1 for recovering uranium mineral values from a permeable bed of ore containing said mineral values said process comprising drying said ore in an agitated state in a gas fired rotary drier to increase permeability of said ore bed, placing said dried ore into a leaching vessel, adding a lixiviant solution comprising 5–10 percent sulfuric acid to said ore bed to leach said uranium mineral values from said ore under pressure sufficient to cause flow of said solution through said bed of ore, percolating said lixiviant solution through said ore to leach said mineral values from said ore, adding an aqueous sweep fluid to said ore to sweep said lixiviant containing dissolved mineral values through said bed of ore, and recovering an effluent lixiviant solution from said bed of ore containing said uranium mineral values.

5. A process of claim 1 wherein the lixiviant is a solvent containing a mineral acid and said effluent lixiviant contains a high fraction of said acid.

* * * * *